(12) United States Patent
Lee et al.

(10) Patent No.: US 8,923,402 B2
(45) Date of Patent: Dec. 30, 2014

(54) MULTI-VIEW VIDEO CODING METHOD

(75) Inventors: Pei-Jun Lee, New Taipei (TW); Jin-Shun Huang, Changhua County (TW)

(73) Assignee: National Chi Nan University, Nantou (TW)

( * ) Notice: Subject to any disclaimer, the term of this patent is extended or adjusted under 35 U.S.C. 154(b) by 650 days.

(21) Appl. No.: 13/226,892

(22) Filed: Sep. 7, 2011

(65) Prior Publication Data

US 2012/0230412 A1 Sep. 13, 2012

(30) Foreign Application Priority Data

Mar. 10, 2011 (TW) .............................. 100108096 A (51) Int. Cl.
*H04N 7/32* (2006.01)
*H04N 7/28* (2006.01)
*H04N 7/26* (2006.01)
*H04N 19/105* (2014.01)
*H04N 19/139* (2014.01)
*H04N 19/597* (2014.01)
*H04N 19/176* (2014.01)
*H04N 19/159* (2014.01)

(52) U.S. Cl.
CPC ... *H04N 19/00024* (2013.01); *H04N 19/00151* (2013.01); *H04N 19/00769* (2013.01); *H04N 19/00278* (2013.01); *H04N 19/00218* (2013.01)
USPC .................................................... 375/240.16

(58) Field of Classification Search
CPC ...................................................... H04N 7/50
See application file for complete search history.

(56) References Cited

U.S. PATENT DOCUMENTS

2008/0273599 A1* 11/2008 Park et al. ................ 375/240.24
2010/0091841 A1* 4/2010 Ishtiaq et al. ............ 375/240.02

OTHER PUBLICATIONS

"Selective disparity estimation and variable size motion estimation based on motion homogeneity for multi-view coding," IEEE Trans. on Broadcasting, pp. 761-7666, Dec. 2009.
"The Middlebury Computer Vision Pages" (http://vision.middlebury.edu/stereo/data), accessed on Mar. 26, 2012.
J.C. Chiang, L.M. Liu, and W.N. Lie, "A hierarchical two-stage neural-classifier for mode decision of H. 264/AVC stereo video encoding," Proc. Of 2nd IEEE 3D TV Conference (3D-TV Conf), Istanbul, Turkey, May 2008.
The Search Report appended in an Office Action issued to Taiwanese Counterpart Application No. 100108096 by the Taiwan Intellectual Property Office on Aug. 28, 2014 along with an English translation thereof provided by the applicant.
\* cited by examiner

*Primary Examiner* — Sath V Perungavoor
*Assistant Examiner* — Kate Luo
(74) *Attorney, Agent, or Firm* — Ladas & Parry, LLP (57) ABSTRACT

In a multi-view video coding method using a hierarchical B-picture (HBP) prediction structure, multiple image sequences in the HBP prediction structure are grouped into main-view image sequences, and auxiliary-view image sequences, each of which is configured to be disposed between corresponding two adjacent main-view image sequences. Each picture to be encoded in each main-view image sequence serves as a first target picture, and is divided into multiple macroblocks. Video data in each macroblock of the first target picture is encoded based on a first reference macroblock unit in accordance with first decision criteria. Each picture to be encoded in each auxiliary-view image sequence serves as a second target picture, and is divided into multiple macroblocks. Video data in each macroblock of the second target picture is encoded based on a second reference macroblock unit in accordance with second decision criteria.

11 Claims, 11 Drawing Sheets

MULTI-VIEW VIDEO CODING METHOD

CROSS-REFERENCE TO RELATED APPLICATION

This application claims priority to Taiwanese Application No. 100108096, filed on Mar. 10, 2011.

BACKGROUND OF THE INVENTION

1. Field of the Invention

The invention relates to a multi-view video coding method, and more particularly to a multi-view video coding method using a hierarchical B-picture (HBP) prediction structure.

2. Description of the Related Art

Figure 1:
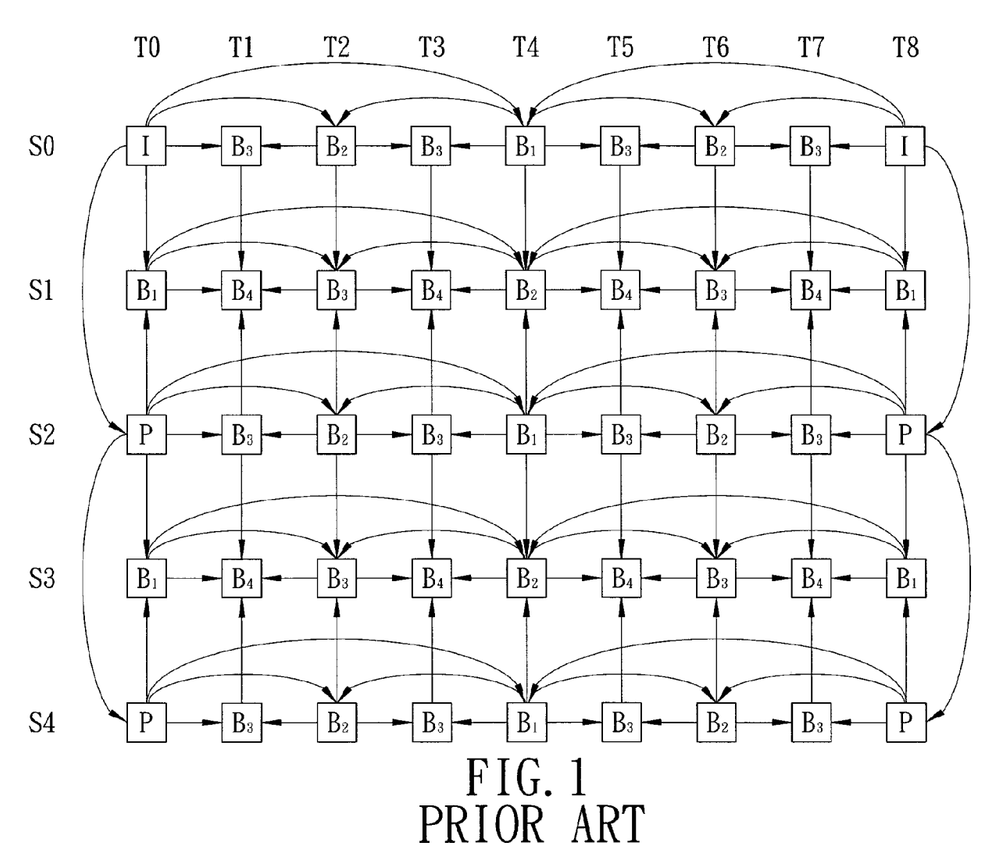
FIG. 1 is a schematic view illustrating a hierarchical B-picture (HBP) prediction structure used in a conventional multi-view video coding method.

FIG. 1 illustrates a conventional multi-view video coding method using a hierarchical B-picture (HBP) prediction structure. The HBP prediction structure includes a plurality of image sequences, each of which includes a plurality of pictures that are captured from an individual viewpoint (S0, S1, S2, S3, S4) at consecutive time-points (T1, T2, T3, T4, T5, T6, T7, T8). In each image sequence, two pictures corresponding respectively to the time-points (T0, T8) denote anchor pictures, and the other pictures denote non-anchor pictures. For each of the image sequences corresponding to the viewpoints (S0, S2, S4), video data in each non-anchor picture is encoded by using two pictures in the same image sequence corresponding to two other time-points as references. For example, the video data of the $B_1$ picture corresponding to the viewpoint (S0) and the time-point (T4) is encoded by using the I picture corresponding to the viewpoint (S0) and the time-point (T0), and the I picture corresponding to the viewpoint (S0) and the time-point (T8). For each of the image sequences corresponding to the viewpoints (S1, S3), video data in each non-anchor picture is encoded by using two pictures in the same image sequence corresponding to the two other time-points, and two pictures from two adjacent image sequences corresponding to the same time-point. For example, video data in the $B_3$ picture corresponding to the viewpoint (S1) and the time-point (T2) is encoded by using the $B_1$ picture corresponding to the viewpoint (S1) and the time-point (T0), the $B_2$ picture corresponding to the viewpoint (S1) and the time-point (T4), the $B_2$ picture corresponding to the viewpoint (S0) and the time-point (T2), and the $B_2$ picture corresponding to the viewpoint (S2) and the time-point (T2). From this example, the pictures in the image sequence corresponding to the viewpoint (S2) have to be encoded before the pictures in the image sequence corresponding to the viewpoint (S1) are encoded. Similarly, the pictures in the image sequence corresponding to the viewpoint (S4) have to be encoded before the pictures in the image sequence corresponding to the viewpoint (S3) are encoded.

It is noted that, during encoding of each non-anchor pictures in each of the image sequences corresponding to the viewpoints (S1, S3), there are four pictures typically used as references, thereby resulting in a huge amount of computation and longer processing time. In addition, a relatively large number of encoding/decoding picture buffers are required. As such, improvements may be made to the above techniques.

SUMMARY OF THE INVENTION

Therefore, an object of the present invention is to provide a multi-view video coding method that can overcome the aforesaid drawbacks of the prior art.

According to the present invention, there is provided a multi-view video coding method using a hierarchical B-picture (HBP) prediction structure. The HBP prediction structure includes a plurality of image sequences. Each of the image sequences corresponds to an individual viewpoint, and includes a plurality of pictures corresponding respectively to consecutive time-points. The multi-view video coding method comprises the steps of:

a) grouping the image sequences into main-view image sequences and auxiliary-view image sequences, and configuring each of the auxiliary-view image sequences to be disposed between corresponding two adjacent ones of the main-view image sequences;

b) for each of the pictures to be encoded in each of the main-view image sequences that serves as a first target picture, dividing the first target picture into a plurality of macroblocks, each of which is in the form of an n×n pixel array, and encoding video data in each of the macroblocks to be encoded of the first target picture based on a first reference macroblock unit, which is associated with a corresponding one of the macroblocks of the first target picture, in accordance with first decision criteria; and c) for each of the pictures to be encoded in each of the auxiliary-view image sequences that serves as a second target picture, dividing the second target picture into a plurality of macroblocks, each of which is in the form of an n×n pixel array, and encoding video data in each of the macroblocks to be encoded of the second target picture based on a second reference macroblock unit, which is associated with a corresponding one of the macroblocks of the second target picture, in accordance with second decision criteria.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 2:
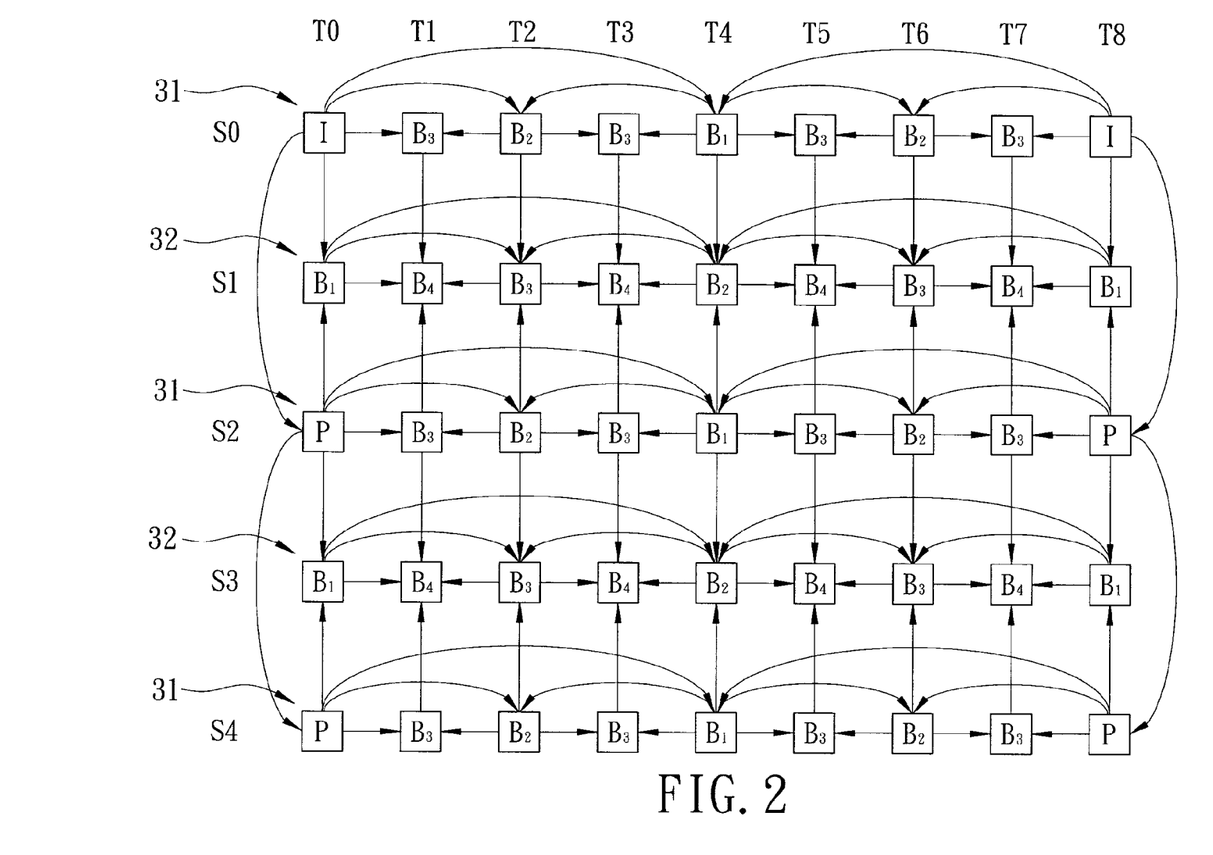
FIG. 2 is a schematic view illustrating an HBP prediction structure used in the preferred embodiment of a multi-view video coding method according to the present invention.

FIG. 2 illustrates an HEP predict ion structure used in the preferred embodiment of a multi-view video coding method according to the present invention. The HBP prediction structure includes a plurality of image sequences, each of which corresponds to an individual viewpoint (S0, S1, S2, S3, S4) and includes a plurality of pictures corresponding respectively to consecutive time-points (T0, T1, T2, T3, T4, T5, T6, T7, T8). The viewpoint (S1) is located at the left of the viewpoint (S(i+1)), where 0≤i≤3. In each image sequence, two pictures corresponding respectively to the time-points (T0, T8) denote anchor pictures, and the other pictures denote non-anchor pictures.

Figure 3:
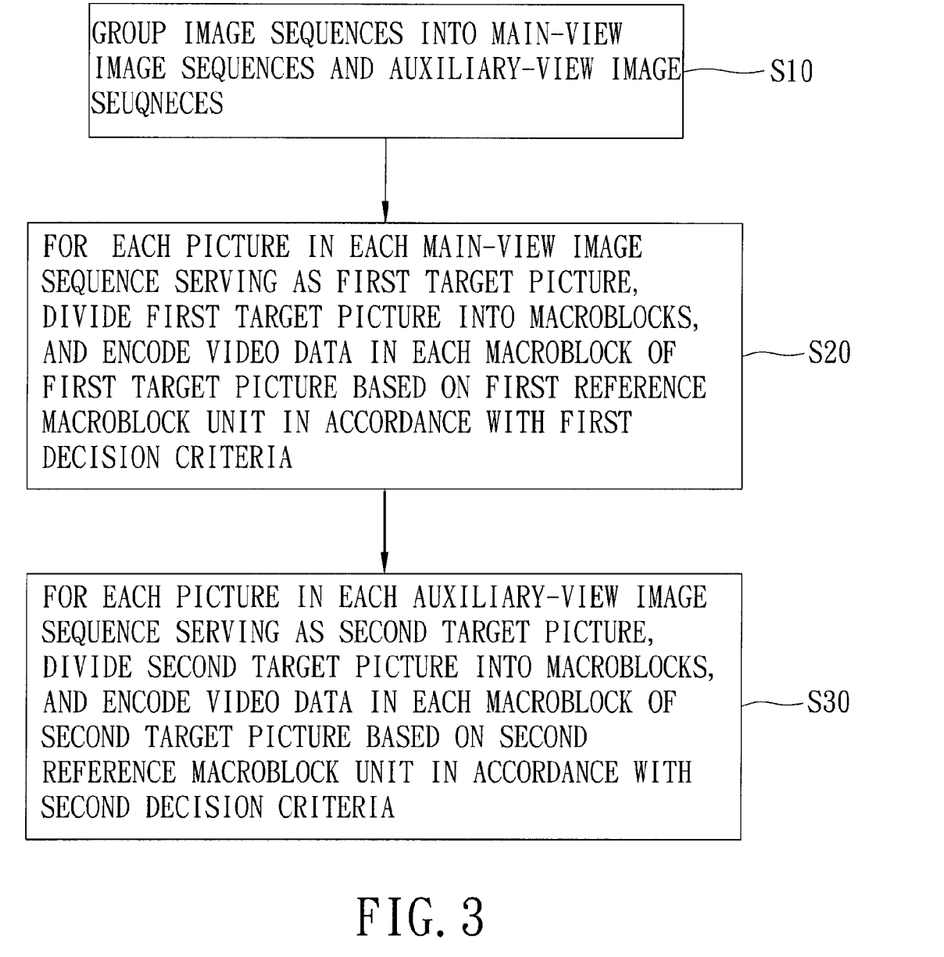
FIG. 3 is a flow chart illustrating the preferred embodiment.

FIG. 3 is a flow chart illustrating the preferred embodiment.

In step S10, the image sequences in the HBP prediction structure are grouped into main-view image sequences denoted by the reference numerals 31 and auxiliary-view image sequences denoted by the reference numerals 32. Each auxiliary-view image sequence 32 is configured to be disposed between corresponding two adjacent main-view image sequences 31.

In step S20, each picture to be encoded in each main-view image sequence 31 serves as a first target picture. The first target picture is divided into a plurality of macroblocks, each of which is in the form of an n×n pixel array, such as a 16×16 pixel array. Then, video data in each macroblock of the first target picture is encoded based on a first reference macroblock unit, which is associated with a corresponding macroblock of the first target picture, in accordance with first decision criteria. It is noted that the macroblocks of the first target picture are encoded in the order of upper left to lower right.

In this embodiment, the first reference macroblock unit includes a first temporal reference macroblock and a second temporal reference macroblock. In addition, a corresponding macroblock of one picture, which corresponds to an earlier time-point relative to that of the first target picture, serves as the first temporal reference macroblock. A corresponding macroblock of one picture, which corresponds to a later time-point relative to that of the first target picture, serves as the second temporal reference macroblock.

Figure 4:
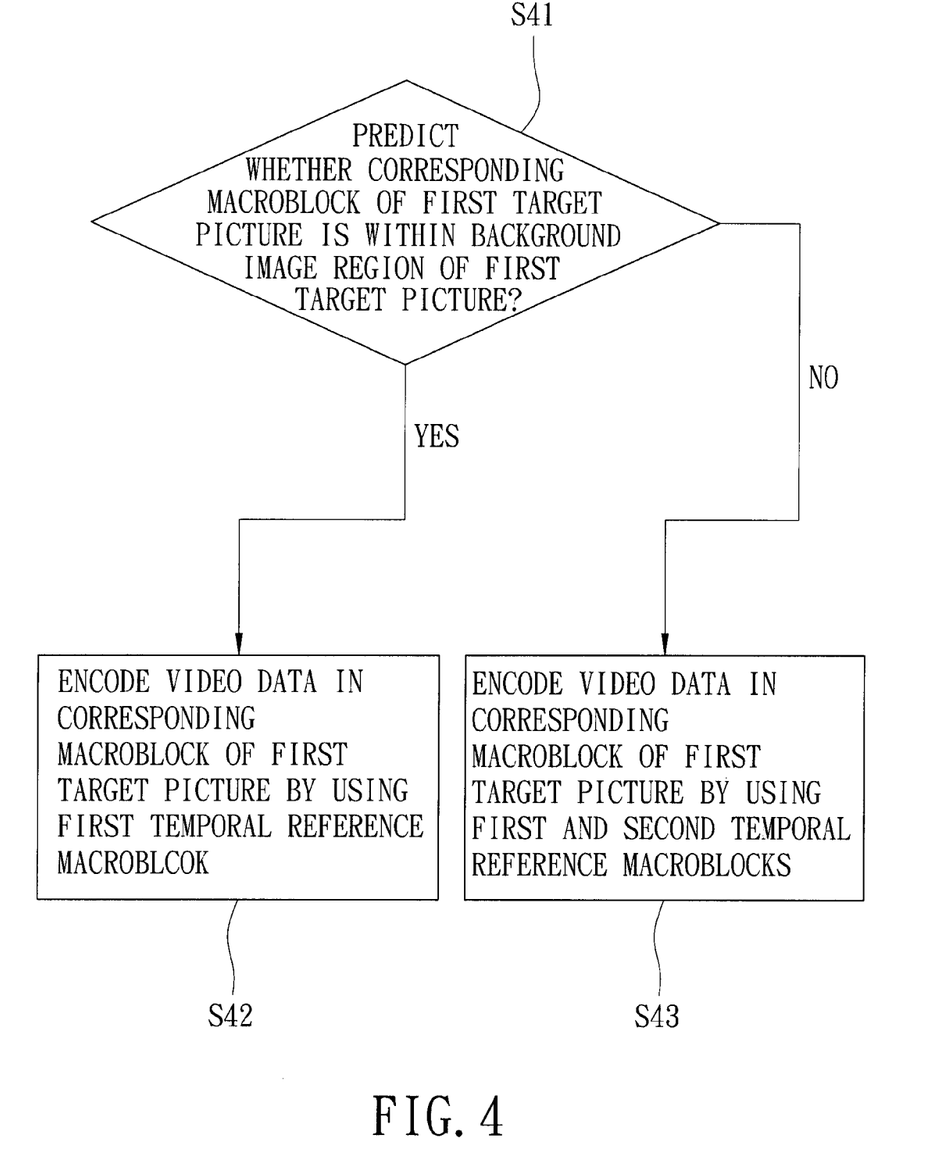
FIG. 4 is a flow chart illustrating the preferred embodiment about how each macroblock of a first target picture is encoded in accordance with first decision criteria.

FIG. 4 is a flow chart illustrating how the corresponding macroblock of the first target picture is encoded in accordance with the first decision criteria.

In step S41, the first decision criteria are configured to predict whether the corresponding macroblock of the first target picture is within a background image region of the first target picture. If the result is affirmative, the flow goes to step S42. Otherwise, the flow goes to step S43. In this embodiment, whether the corresponding macroblock of the first target picture is within the background image of the first target picture that is predicted based on a motion vector value (MV) associated with a left, upper or upper left macroblock relative to the corresponding one of the macroblocks of the first target picture. The motion vector value (MV) can be obtained by the following Equations (1) and (2):

$$MAE(i, j) = \frac{1}{N^2} \sum_{k=1}^{N} \sum_{l=1}^{N} |x_t(k, l) - x_{t-1}(k+i, l+j)| \quad (1)$$

$$MV = (Vec_i, Vec_j) = (i, j)|_{minMAE(i,j)} \quad (2)$$

where $x_t(k,l)$ denotes each pixel value of the left, upper or upper left macroblock of the first target picture, and $x_{t-1}(k+i, l+j)$ denotes a corresponding pixel value of a macroblock of the target picture leading the left, upper or upper left macroblock. Thus, when the motion vector value (MV) is zero, the corresponding macroblock of the first target picture is predicted to be within the background image region. When the motion vector value (MV) is not zero, the corresponding macroblock of the first target picture is predicted to be not within the background image region.

In step S42, when the motion vector value (MV) is zero, the video data in the corresponding macroblock of the first target picture is encoded by using the first temporal reference macroblock of the first reference macroblock unit.

In step S43, when motion vector value (MV) is not zero, the video data in the corresponding macroblock of the first target picture is encoded by using the first and second temporal reference macroblock of the first reference macroblock unit.

Figure 5:
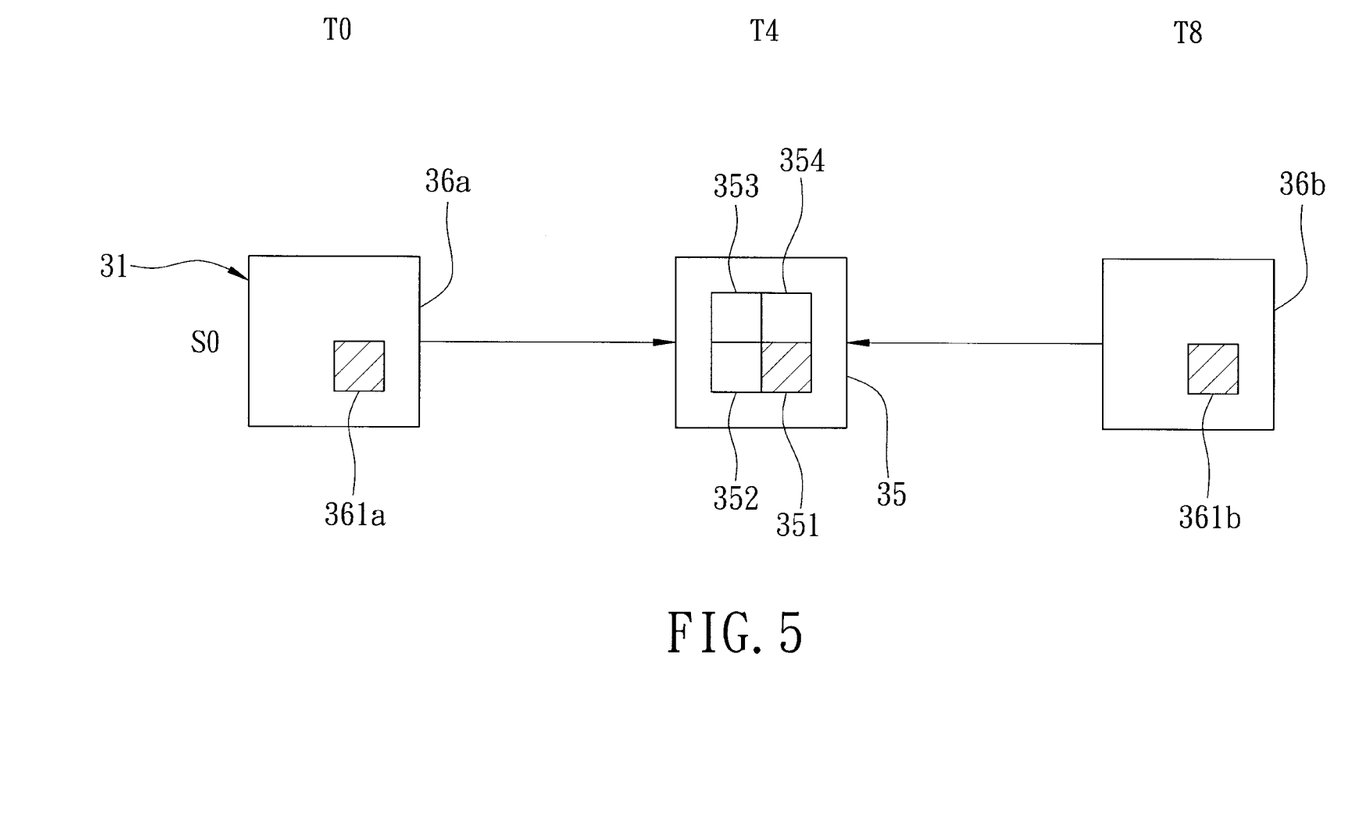
FIG. 5 is a schematic view showing an example of encoding video data in a macroblock of a first target picture.

For example, as shown in FIG. 5, in the main-view image sequence 31 corresponding to the viewpoint (S0), video data in a macroblock 351 of a first target picture 35, which corresponds to the time-point (T4), is encoded by using a corresponding macroblock (361a) of a picture (36a) corresponding to the time-point (T0) when a motion vector value (MV) associated with a left macroblock 352, an upper macroblock 354 or an upper left macroblock 353 is zero, and by using the corresponding macroblock (361a) of the picture (36a), and a corresponding macroblock (361b) of a picture (36b) corresponding to the time-point (T8) when the motion vector value (MV) is not zero. In this example, the macroblocks (361a, 361b) serve respectively as the first and second temporal reference macroblocks of the first reference macroblock unit.

In step S30, each picture to be encoded in each auxiliary-view image sequence 32 serves as a second target picture. The second target picture is divided into a plurality of macroblocks, each of which is in the form of an n×n pixel array, such as a 16×16 pixel array. Then, video data in each macroblock of the second target picture is encoded based on a second reference macroblock unit, which is associated with a corresponding macroblock of the second target picture, in accordance with second decision criteria. Similar to the first target picture, the macroblocks of the second target picture are encoded in the order of upper left to lower right.

In this embodiment, the second reference macroblock unit includes a pair of first and second temporal reference macroblocks, and a pair of first and second spatial reference macroblocks. In addition, a corresponding macroblock of one picture, which is in one main-view image sequence 31 adjacent to a corresponding auxiliary-view image sequence 32 and corresponding to a viewpoint at the left of that of the corresponding auxiliary-view image sequence 32, and which corresponds to the same time-point as that of the second target picture, serves as the first spatial reference macroblock. A corresponding macroblock of one picture, which is in one main-view image sequence 31 adjacent to the corresponding auxiliary-view image sequence 32 and corresponding to a viewpoint at the right of that of the corresponding auxiliary-view image sequence 32, and which corresponds to the same time-point as that of the second target picture, serves as the second spatial reference macroblock. Furthermore, in the corresponding auxiliary-view image sequence 32, a corresponding macroblock of one picture, which corresponds to an earlier time-point relative to that of the second target picture, serves as the first temporal reference macroblock of the second reference macroblock unit, and a corresponding macroblock of one picture, which corresponds to a later time-point relative to that of the second target picture, serves as the second temporal reference macroblock of the second reference macroblock unit.

Figure 6A:
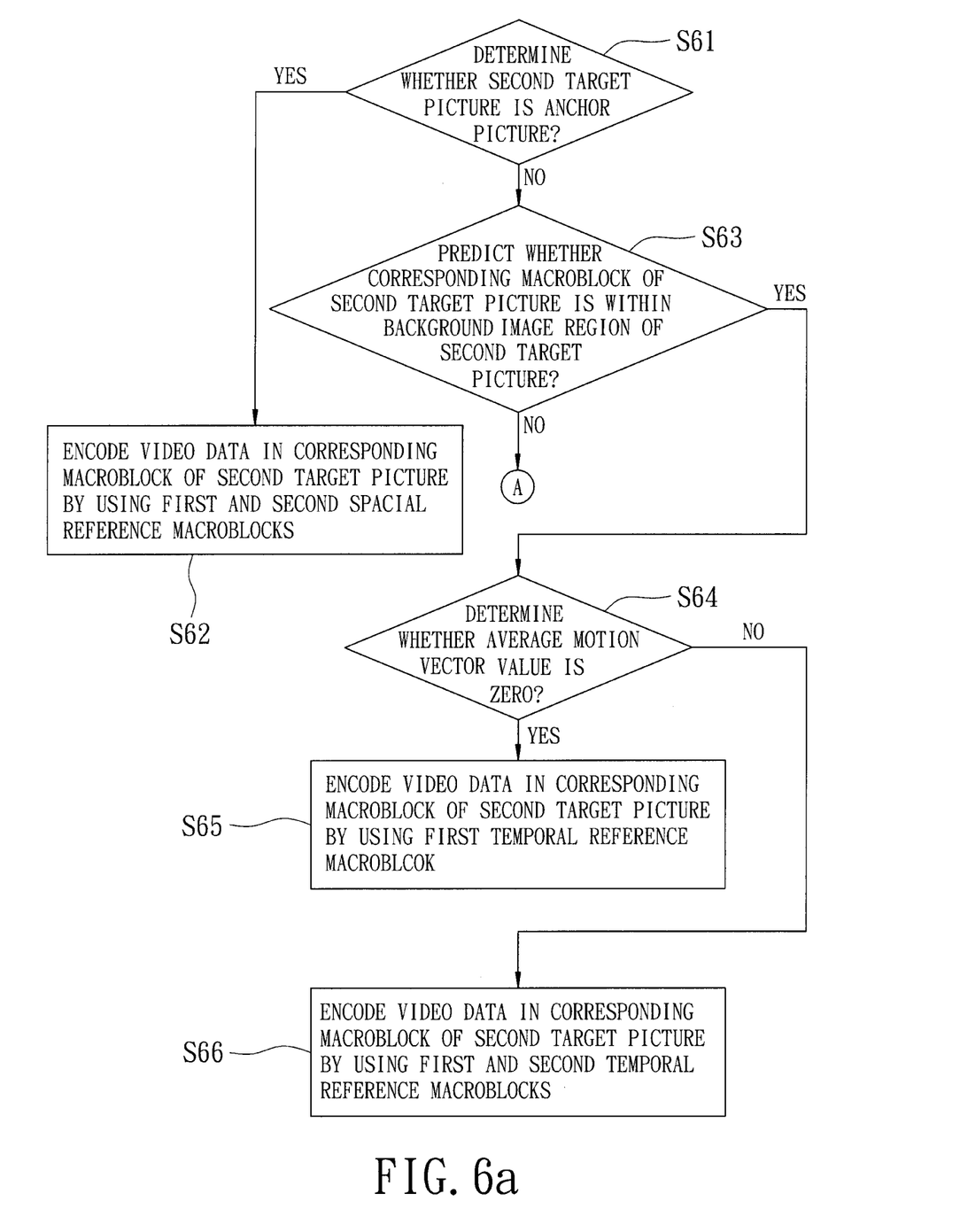
FIGS. 6a and 6b are flow charts illustrating the preferred embodiment about how each macroblock of a second target picture is encoded in accordance with second decision criteria.
Figure 6B:
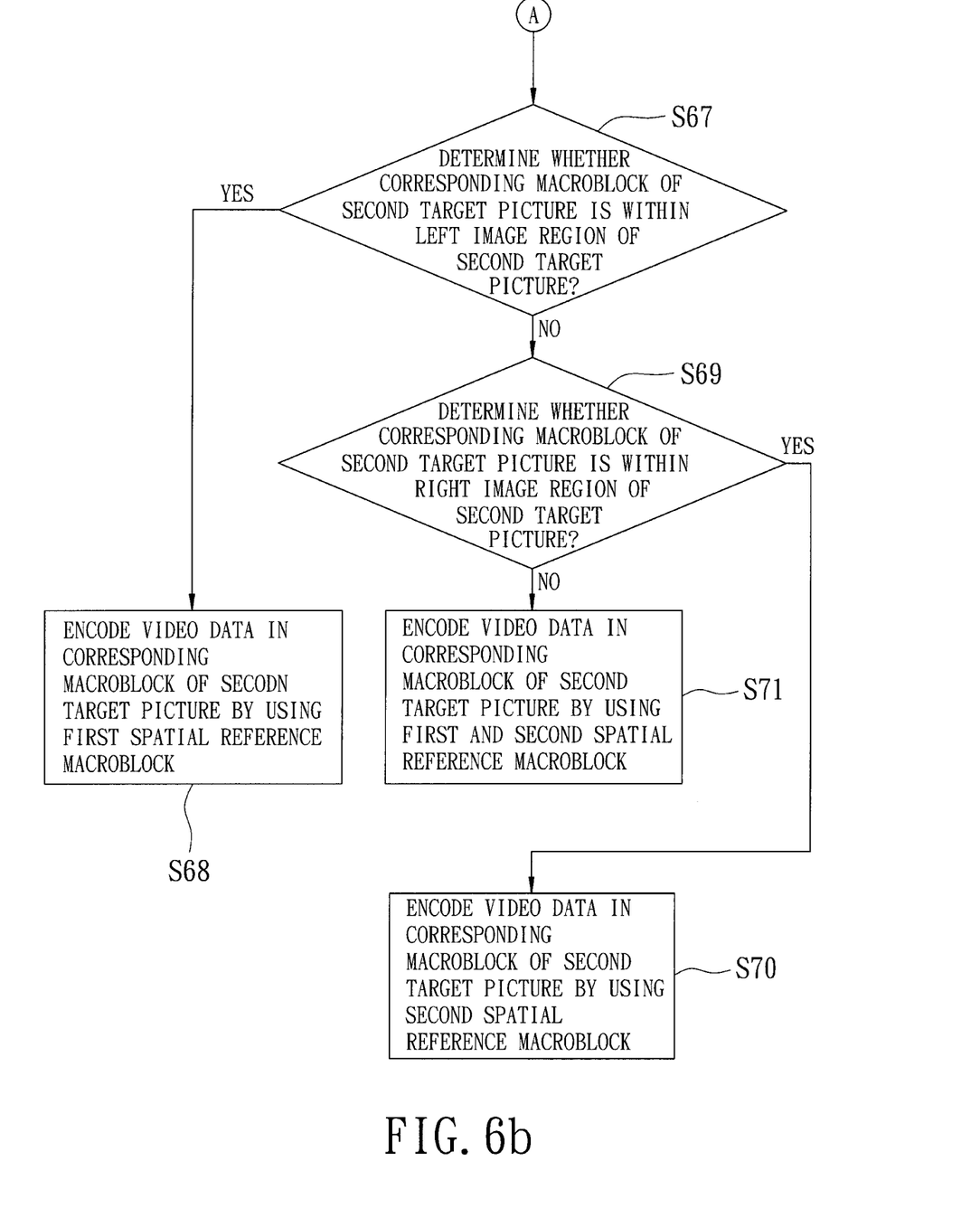

FIGS. 6a and 6b are flow charts illustrating how the corresponding macroblock of the second target picture is encoded in accordance with the second decision criteria.

In step S61, the second decision criteria are configured to determine whether the second target picture is an anchor picture. If the result is affirmative, the flow goes to step S62. Otherwise, the flow goes to step S63.

Figure 7:
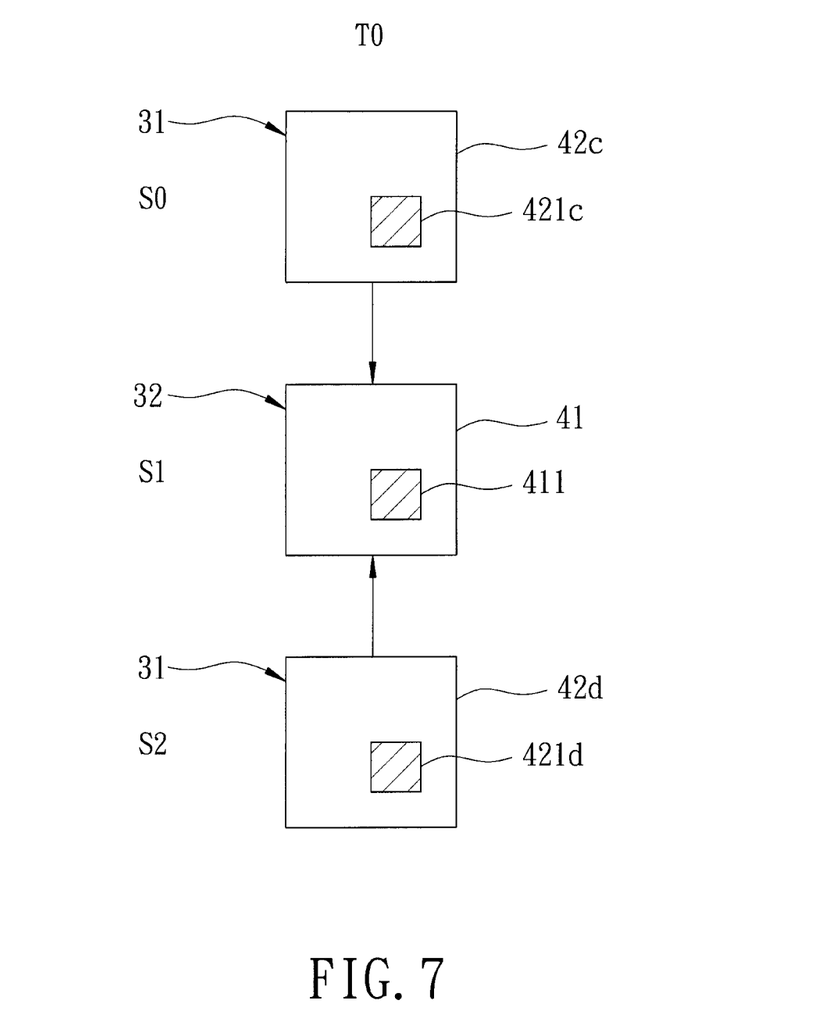
FIG. 7 is a schematic view showing an example of encoding video data in a macroblock of a second target picture when the second target picture is an anchor picture.

In step S62, when the second target picture is an anchor picture, the video data in the corresponding macroblock of the second target picture is encoded by using the first and second spatial reference macroblocks of the second reference macroblock unit. For example, as shown in FIG. 7, in the auxiliary-view image sequence 32 corresponding to the viewpoint (S1), video data in a macroblock 411 of a second target picture 41, which corresponds to the time-point (T0), i.e., an anchor picture, is encoded by using a corresponding macroblock (421c) of a picture (42c), which is in an adjacent main-view image sequence 31 corresponding to the viewpoint (S0), and which corresponds to the time-point (T0), and a corresponding macroblock (421d) of a picture (42d), which is in an adjacent main-view image 31 corresponding to the viewpoint (S2), and which corresponds to the time-point (T0). In this example, the macroblocks (421c, 421d) serve respectively as the first and second spatial reference macroblocks of the second reference macroblock unit.

In step S63, when the second target picture is not an anchor picture, i.e., the second target picture is a non-anchor picture, the second decision criteria are configured to predict whether the corresponding macroblock of the second target picture is within a background image region of the second target picture. If the result is affirmative, the flow goes to step S64. Otherwise, the flow goes to step S67. In this embodiment, whether the corresponding macroblock of the second target picture is within the background image of the first target picture that is predicted based on a motion vector complexity value (MD) and an average motion vector value (MV$_{average}$) associated with at most left, upper and upper left macroblocks relative to the corresponding macroblock of the second target picture. The motion vector complexity value (MD) can be obtained by the following Equations (3), (4) and (5):

$$MD_x(m, n) = \frac{1}{48} \sum_{(i,j)\in Z} \left| mvx_{i,j} - \frac{1}{48} \sum_{(u,v)\in Z} mvx_{u,v} \right| \quad (3)$$

$$MD_y(m, n) = \frac{1}{48} \sum_{(i,j)\in Z} \left| mvy_{i,j} - \frac{1}{48} \sum_{(u,v)\in Z} mvy_{u,v} \right| \quad (4)$$

$$MD(m, n) = \sqrt{MD_x^2(m, n) + MD_y^2(m, n)} \quad (5)$$

The average motion vector value (MV$_{average}$) can be obtained by the following Equation (6):

$$MV_{average} = \frac{1}{48} \sqrt{\left( \sum_{(u,v)\in Z} mvx_{u,v} \right)^2 + \left( \sum_{(u,v)\in Z} mvy_{u,v} \right)^2} \quad (6)$$

where mvx denotes a component value of a motion vector in an X-axis direction corresponding to a 4×4 pixel array of each of the left, upper and upper left macroblocks, and mvy denotes a component value of a motion vector in a Y-axis direction corresponding to a 4×4 pixel array of each of the left, upper and upper left macroblocks. Thus, when the motion vector complexity value (MD) and the average motion vector value (MV$_{average}$) are respectively smaller than a predetermined first threshold value, such as 8, and a predetermined second threshold value, such as 1, the corresponding macroblock of the second target picture is predicted to be within the background image region of the second target picture.

Figure 8:
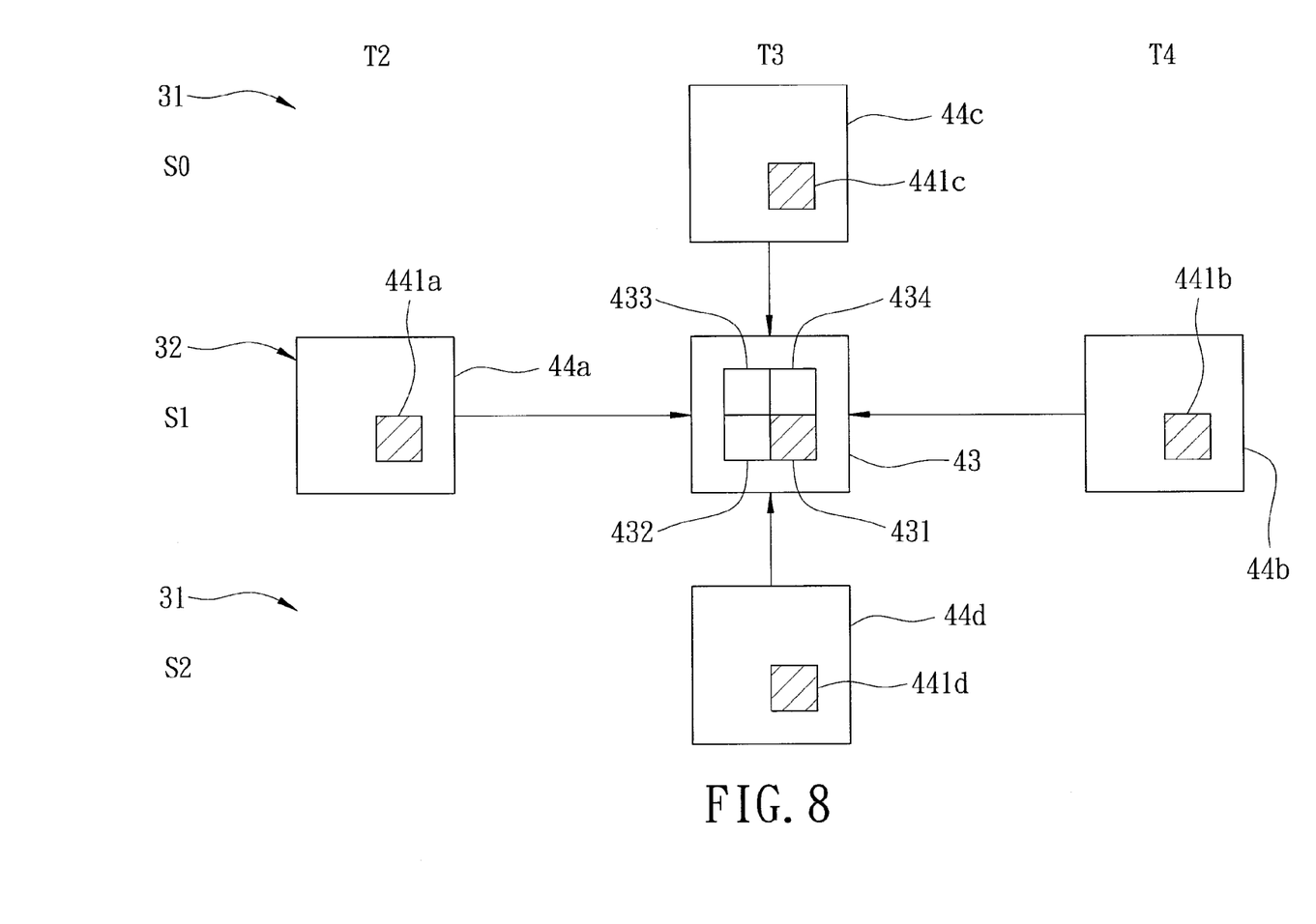
FIGS. 8 and 9 are schematic views illustrating an example of encoding video data in a macroblock of a second target picture when the second target picture is a non-anchor picture.

For example, as shown in FIG. 8, for a macroblock 431 of a second target picture 43, which is in the auxiliary-view image sequence 32 corresponding to the viewpoint (S1) and which corresponds to the time-point (T3), a motion vector complexity value (MD) and the average motion vector value (MV$_{average}$) associated with a left macroblock 432, an upper macroblock 434 and an upper left macroblock 433 are obtained so as to predict whether the macroblock 43 of the second target picture 43 is within a background image region of the second target picture 43.

In step S64, when the motion vector complexity value (MD) is smaller than the predetermined first threshold value while the average motion vector value (MV$_{average}$) is smaller than the predetermined second threshold value, the second decision criteria are configured to determine whether the average motion vector value (MV$_{average}$) is zero. If the result is affirmative, the flow goes to step S65. Otherwise, the flow goes to step S66.

In step S65, when the average motion vector value MV$_{average}$) is zero, the video data in the corresponding macroblock of the second target picture is encoded by using the first temporal reference macroblock of the second reference macroblock unit. As the same example shown in FIG. 8, when the average motion vector value (MV$_{average}$) associated with the left, upper and upper lefts 432, 434, 433 is zero, video data in the macroblock 431 of the second target picture 43 is encoded by using a corresponding macroblock (441a) of a picture (44a), which is in the same auxiliary-view image sequence 32 as the second target picture 43 and which corresponds to the time-point (T2).

In step S66, when the average motion vector value (MV$_{average}$) is not zero, the video data in the corresponding macroblock of the second target picture is encoded by using the first and second temporal reference macroblocks of the second reference macroblock unit. As the same example shown in FIG. 8, when the average motion vector value (MV$_{average}$) associated with the left, upper and upper lefts 432, 434, 433 is not zero, the video data in the macroblock 431 of the second target picture 43 is encoded by using the macroblock (441a), and a corresponding macroblock (441b) of a picture (44b), which is in the same auxiliary-view image sequence 32 as the second target picture (43) and which corresponds to the time-point (T4). Thus, in this example, the macroblocks (441a, 441b) serve respectively as the first and second temporal reference macroblocks of the second reference macroblock unit.

In step S67, when one of the motion vector complexity value (MD) and the average motion vector value (MV$_{average}$) is not smaller than a corresponding one of the predetermined first and second threshold values, i.e., the corresponding macroblock of the second target picture is predicted to be within a foreground image region of the second target picture, the second decision criteria are configured to determine whether the corresponding macroblock of the second target picture is within a left image region of the second target picture. If the result is affirmative, the flow goes to step S68. Otherwise, the flow goes to step S69. In this embodiment, the left image region of the second target picture is a rectangular region with a width equal to six times the width of a macroblock of the second picture target.

Figure 9:
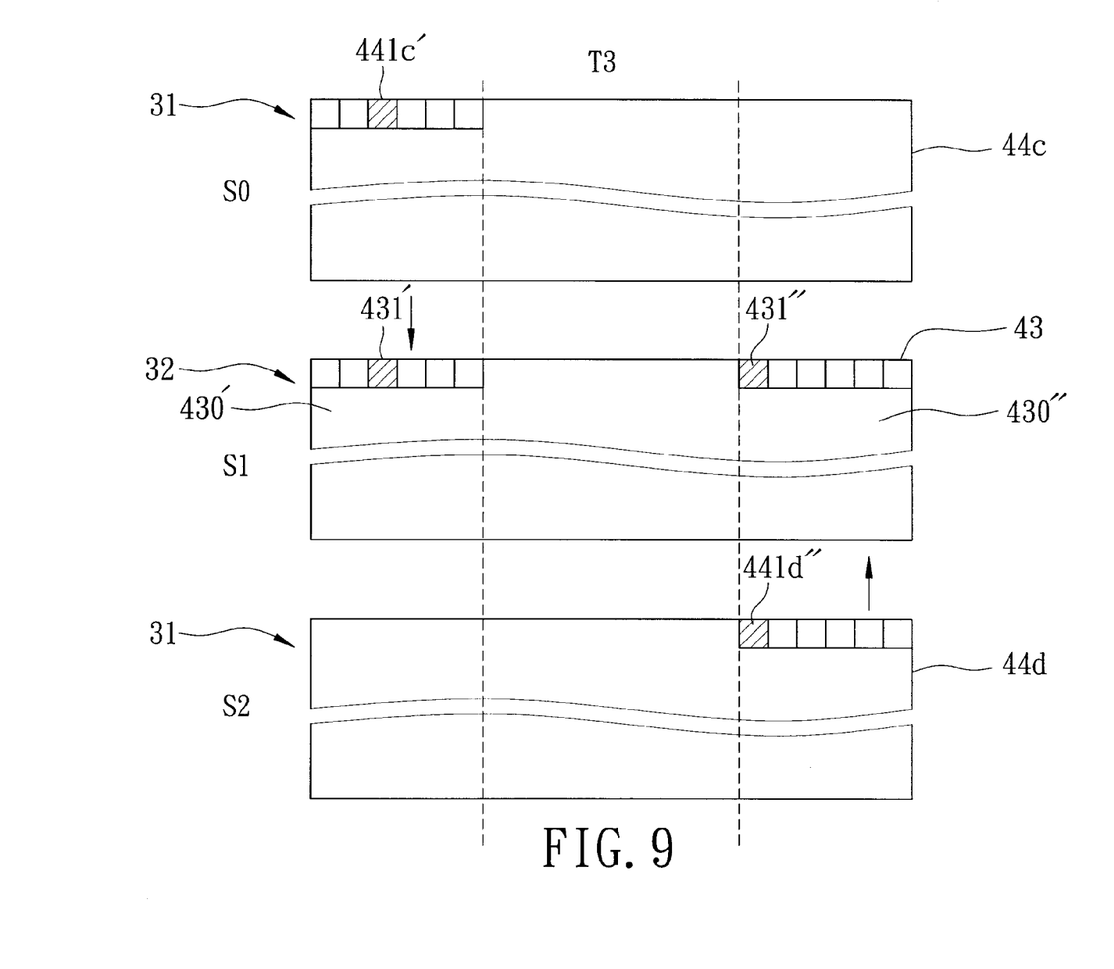

In step S68, when the corresponding macroblock of the second target picture is within the left image region of the second target picture, the video data in the corresponding macroblock of the second target picture is encoded by using the first spatial reference macroblock. For example, as shown in FIG. 9, for the second target picture 43 in FIG. 8, when a macroblock 431' of the second target picture 43 is within a left image region 430' of the second target picture 43, video data in the macroblock 431' is encoded by using a corresponding macroblock (441c') of a picture (44c), which is in an adjacent main-view image sequence 31 corresponding to the viewpoint (S0), and which corresponds to the time-point (T3). In this example, the macroblock (441c') serves as the first spatial reference macroblock of the second reference macroblock unit.

In step S69, the second decision criteria are configured to determine whether the corresponding macroblock of the second target picture is within a right image region of the second target picture. If the result is affirmative, the flow goes to step S70. Otherwise, the flow goes to step S71. In this embodiment, the right image region has the same size as that of the left image region.

In step S70, when the corresponding macroblock of the second target picture is within the right image region of the second target picture, the video data in the corresponding macroblock of the second target picture is encoded by using the second spatial reference macroblock. For example, as shown in FIG. 9, for the second target picture 43 in FIG. 8, when a macroblock 431" of the second target picture 43 is within a right image region 430" of the second target picture 43, video data in the macroblock 431" is encoded by using a corresponding macroblock (441d") of a picture (44d), which is in an adjacent main-view-image sequence 31 corresponding to the viewpoint (S2), and which corresponds to the time-point (T3). In this example, the macroblock (441d") serves as the second spatial reference macroblock of the second reference macroblock unit.

In step S71, when the corresponding macroblock of the second target picture is not within any one of the left and right image regions of the second target picture, the video data in the corresponding macroblock of the second target picture is encoded by using the first and second spatial reference macroblocks of the second reference macroblock unit. As the same example shown in FIG. 8, if the macroblock 431 of the second target picture 43 is not within any one of the left and right image regions of the second target picture 43, the video data in the macroblock 431 of the second target picture 43 is encoded by using a corresponding macroblock (441c) of the picture (44c) corresponding to the viewpoint (S0) and the time-point (T3), and a corresponding macroblock (441d) of the picture (44d) corresponding to the viewpoint (S2) and the time-point (T3). In this example, the macroblocks (441c, 441d) serve respectively as the first and second spatial reference macroblocks of the second reference macroblock unit.

Figure 10:
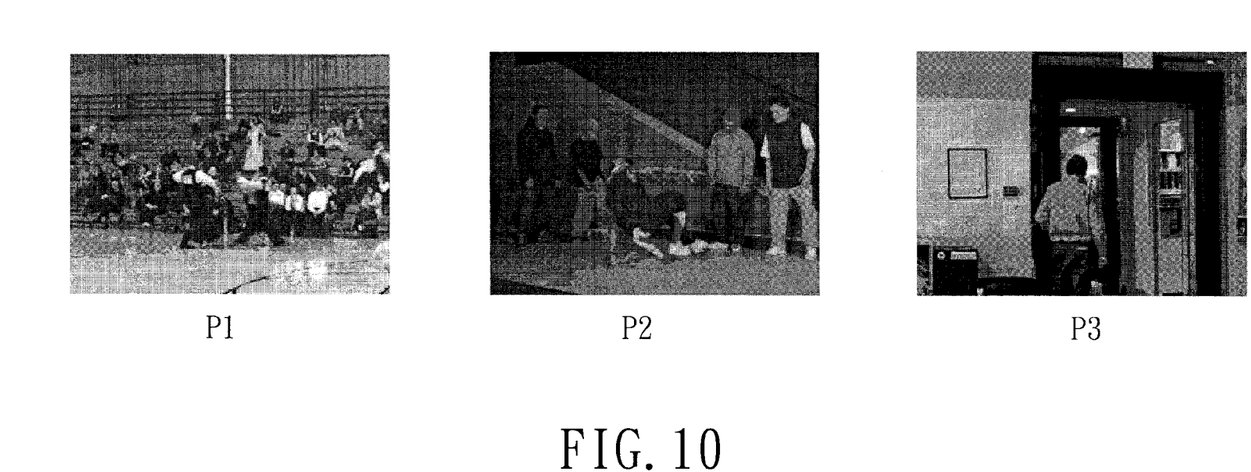
FIG. 10 shows various two-dimensional test pictures.

FIG. 10 illustrates three representative pictures (P1, P2, P3) corresponding respectively to various multi-view image sequences provided from "The Middlebury Computer Vision Pages" (http://vision.middlebury.edu/). In an experiment for encoding main-view image sequences corresponding to each of the pictures (P1, P2, P3) using a conventional multi-view video coding method, which has been developed by the Joint Video Team (JVT) of Video Coding Experts Groups (VCEG) and Moving Picture Experts Group (MPEG) (hereinafter referred to as the JMVC method), and the preferred embodiment under various search ranges (SR) and various quantization parameters (QP), the experimental results related to peak signal-to-noise ratio (PSNR) for encoded data generated using each of the JMVC method and the preferred embodiment, bit rate for each pixel, and processing time required by each of the JMVC method and the preferred embodiment are shown in Tables 1, 2 and 3 below. In this experiment, the macroblock in the preferred embodiment is a 16×16 pixel array, the search ranges are respectively 32 and 96, and the quantization parameters are respectively 22, 27, 32 and 37.

TABLE 1

|  | SR | QP | Method | PSNR | Bit rate | Processing time |
|---|---|---|---|---|---|---|
| P1 | 32 | 37 | JMVC | 31.7974 | 220.5692 | 4292.33 |
|  |  |  | Preferred embodiment | 31.7377 | 226.0778 | 2784.33 |
|  |  | 32 | JMVC | 34.5172 | 394.4522 | 4438.73 |
|  |  |  | Preferred embodiment | 34.4772 | 403.1202 | 2936.64 |
|  |  | 27 | JMVC | 37.1067 | 744.9226 | 4621.37 |
|  |  |  | Preferred embodiment | 37.0751 | 756.415 | 3083.19 |
|  |  | 22 | JMVC | 39.3342 | 1609.507 | 4834.69 |
|  |  |  | Preferred embodiment | 39.2742 | 1618.512 | 3297.13 |
|  | 96 | 37 | JMVC | 31.7806 | 216.8074 | 6992.17 |
|  |  |  | Preferred embodiment | 31.757 | 221.0234 | 4992.59 |
|  |  | 32 | JMVC | 34.5161 | 390.3944 | 7479.25 |
|  |  |  | Preferred embodiment | 34.5017 | 396.7556 | 5143.37 |
|  |  | 27 | JMVC | 37.104 | 740.8876 | 7957.41 |
|  |  |  | Preferred embodiment | 37.0935 | 751.1364 | 5474.31 |
|  |  | 22 | JMVC | 39.3316 | 1606.266 | 8539.91 |
|  |  |  | Preferred embodiment | 39.3107 | 1616.977 | 6287.47 |

TABLE 2

|  | SR | QP | Method | PSNR | Bit rate | Processing time |
|---|---|---|---|---|---|---|
| P2 | 32 | 37 | JMVC | 35.4648 | 161.2758 | 4226.014 |
|  |  |  | Preferred embodiment | 35.3397 | 164.4642 | 2653.14 |
|  |  | 32 | JMVC | 37.4226 | 283.1466 | 4447.594 |
|  |  |  | Preferred embodiment | 37.3363 | 289.0065 | 2932.828 |
|  |  | 27 | JMVC | 38.8046 | 570.5758 | 4707.14 |
|  |  |  | Preferred embodiment | 38.7614 | 582.8622 | 3182.186 |
|  |  | 22 | JMVC | 40.0154 | 1534.136 | 5106.826 |
|  |  |  | Preferred embodiment | 39.9989 | 1562.798 | 3570.843 |
|  | 96 | 37 | JMVC | 35.4492 | 159.105 | 7385.921 |
|  |  |  | Preferred embodiment | 35.3218 | 162.5649 | 4657.108 |
|  |  | 32 | JMVC | 37.4182 | 279.9729 | 8485.968 |
|  |  |  | Preferred embodiment | 37.3292 | 286.5003 | 5643.657 |
|  |  | 27 | JMVC | 38.8002 | 566.5608 | 9790.905 |
|  |  |  | Preferred embodiment | 38.7564 | 579.033 | 6654.655 |
|  |  | 22 | JMVC | 40.0131 | 1525.652 | 11494.66 |
|  |  |  | Preferred embodiment | 39.9963 | 1554.378 | 8142.766 |

TABLE 3

| SR | QP | Method | PSNR | Bit rate | Processing time |
|---|---|---|---|---|---|
| P3 32 | 37 | JMVC | 34.341 | 92.2148 | 4059.78 |
| | | Preferred embodiment | 34.256 | 95.7886 | 2599.94 |
| | 32 | JMVC | 36.661 | 165.4242 | 4178.34 |
| | | Preferred embodiment | 36.605 | 168.4462 | 2769.59 |
| | 27 | JMVC | 38.524 | 331.5154 | 4318.12 |
| | | Preferred embodiment | 38.484 | 336.543 | 2939.09 |
| | 22 | JMVC | 40.095 | 937.3912 | 4581.94 |
| | | Preferred embodiment | 40.033 | 944.1636 | 3291.78 |
| 96 | 37 | JMVC | 34.3455 | 92.4038 | 5922.264 |
| | | Preferred embodiment | 34.31325 | 93.9904 | 4468.671 |
| | 32 | JMVC | 36.65845 | 163.401 | 6331.749 |
| | | Preferred embodiment | 36.63968 | 166.061 | 4663.734 |
| | 27 | JMVC | 38.52798 | 329.044 | 6797.015 |
| | | Preferred embodiment | 38.5139 | 334.1302 | 5220.015 |
| | 22 | JMVC | 40.09358 | 935.1128 | 7798.892 |
| | | Preferred embodiment | 40.06868 | 940.6548 | 6156.077 |

As shown in Tables 1, 2 and 3, the preferred embodiment can provide PSNR similar to that of the JMVC method. Particularly, the preferred embodiment can reduce processing time so much as compared to the JMVC method.

In an experiment for encoding auxiliary-view image sequences corresponding to each of the pictures (P1, P2, P3) using the JMVC method, another conventional multi-view video coding method, which has been proposed in an article by Zhang et al., entitled "Selective Disparity Estimation and Variable Size Motion Estimation Based on Motion Homogeneity for Multi-View Coding," IEEE Trans. on Broadcasting, pp. 1-766, December 2009 (hereinafter referred to as the Shen method), and the preferred embodiment under the same conditions as the above experiment, the experimental results related to PSNR for encoded data generated using each of the JMVC method, the Shen method and the preferred embodiment, bit-rate for each pixel, and processing time required by each of the conventional JMVC method, the Shen method and the preferred embodiment are shown in Tables 4, 5 and 6 below.

TABLE 4

| SR | QP | Method | PSNR | Bit rate | Processing time |
|---|---|---|---|---|---|
| P1 32 | 22 | JMVC | 40.09 | 1185.18 | 2136.5 |
| | | Shen | 40.06 | 1214.69 | 1108.56 |
| | | Preferred embodiment | 40.06 | 1213.56 | 1105.12 |
| | 27 | JMVC | 37.9 | 531.6 | 1926.89 |
| | | Shen | 37.86 | 534.62 | 989.25 |
| | | Preferred embodiment | 37.85 | 545.24 | 1005.21 |
| | 32 | JMVC | 35.16 | 272.43 | 1897.930 |
| | | Shen | 35.09 | 281.52 | 870.22 |
| | | Preferred embodiment | 35.08 | 282.97 | 890.31 |
| | 37 | JMVC | 32.36 | 156.37 | 1726.43 |
| | | Shen | 32.28 | 161.86 | 754.68 |
| | | Preferred embodiment | 32.25 | 163.25 | 778.54 |
| 96 | 22 | JMVC | 39.21 | 1386.57 | 5487.57 |
| | | Shen | 39.19 | 1418.54 | 2824.26 |
| | | Preferred embodiment | 39.19 | 1414.15 | 2784 |

TABLE 4-continued

| SR | QP | Method | PSNR | Bit rate | Processing time |
|---|---|---|---|---|---|
| | 27 | JMVC | 37.91 | 525.26 | 5048.73 |
| | | Shen | 37.88 | 540.69 | 2462.32 |
| | | Preferred embodiment | 37.87 | 542.22 | 2480.21 |
| | 32 | JMVC | 35.18 | 267.4 | 4668.73 |
| | | Shen | 35.14 | 276.8 | 2189.56 |
| | | Preferred embodiment | 35.14 | 277.51 | 2239.71 |
| | 37 | JMVC | 32.36 | 152.34 | 4114.42 |
| | | Shen | 32.33 | 156.68 | 1995.26 |
| | | Preferred embodiment | 32.32 | 158 | 1984.42 |

TABLE 5

| SR | QP | Method | PSNR | Bit rate | Processing time |
|---|---|---|---|---|---|
| P1 32 | 22 | JMVC | 40.2396 | 1246.62 | 2232.14 |
| | | Shen | 40.2169 | 1270.568 | 1510.564 |
| | | Preferred embodiment | 40.219 | 1264.324 | 1544.421 |
| | 27 | JMVC | 38.8864 | 428.9697 | 1797.922 |
| | | Shen | 38.8569 | 437.568 | 1095.689 |
| | | Preferred embodiment | 38.8654 | 438.5645 | 1125.599 |
| | 32 | JMVC | 37.3795 | 206.9796 | 1902.531 |
| | | Shen | 37.3498 | 211.248 | 1041.265 |
| | | Preferred embodiment | 37.3568 | 212.8704 | 1051.703 |
| | 37 | JMVC | 35.2861 | 119.712 | 1582.437 |
| | | Shen | 35.2589 | 122.365 | 792.568 |
| | | Preferred embodiment | 35.2698 | 123.665 | 795.2545 |
| 96 | 22 | JMVC | 40.1898 | 1242.202 | 5385.156 |
| | | Shen | 40.1685 | 1272.568 | 3524.268 |
| | | Preferred embodiment | 40.1727 | 1267.752 | 3616.719 |
| | 27 | JMVC | 38.8932 | 427.968 | 4456.812 |
| | | Shen | 38.8659 | 436.578 | 2635.987 |
| | | Preferred embodiment | 38.8724 | 435.901 | 2846.171 |
| | 32 | JMVC | 37.3607 | 203.9016 | 3772.235 |
| | | Shen | 37.3387 | 208.184 | 2091.591 |
| | | Preferred embodiment | 37.3302 | 209.1172 | 2209.578 |
| | 37 | JMVC | 35.2973 | 118.3548 | 3185.219 |
| | | Shen | 35.2611 | 120.664 | 1548.854 |
| | | Preferred embodiment | 35.2589 | 121.598 | 1686.268 |

TABLE 6

| SR | QP | Method | PSNR (dB) | Bit rate | Processing time (sec) |
|---|---|---|---|---|---|
| P1 32 | 22 | JMVC | 40.1249 | 826.8144 | 2687.39 |
| | | Shen | 40.1119 | 832.5897 | 1486.598 |
| | | Preferred embodiment | 40.1018 | 832.108 | 1473.984 |
| | 27 | JMVC | 38.5695 | 252.5898 | 2455.646 |
| | | Shen | 38.5348 | 255.891 | 1273.598 |
| | | Preferred embodiment | 38.5288 | 255.254 | 1289.368 |
| | 32 | JMVC | 36.9137 | 121.1984 | 2551.656 |
| | | Shen | 36.8898 | 122.985 | 1020.598 |
| | | Preferred embodiment | 36.8859 | 123.4136 | 1000.125 |
| | 37 | JMVC | 34.5589 | 68.2567 | 2101.598 |
| | | Shen | 34.5487 | 69.2891 | 965.268 |
| | | Preferred embodiment | 34.5297 | 69.9198 | 905.265 |

TABLE 6-continued

| SR | QP | Method | PSNR (dB) | Bit rate | Processing time (sec) |
|---|---|---|---|---|---|
| 96 | 22 | JMVC | 40.0766 | 811.6184 | 4930.218 |
|  |  | Shen | 40.0668 | 820.981 | 2406.598 |
|  |  | Preferred embodiment | 40.0595 | 820.268 | 2478.568 |
|  | 27 | JMVC | 38.6795 | 249.3312 | 4474.86 |
|  |  | Shen | 38.6587 | 252.2691 | 2189.568 |
|  |  | Preferred embodiment | 38.6422 | 253.0683 | 2169.257 |
|  | 32 | JMVC | 36.8644 | 115.892 | 4096.125 |
|  |  | Shen | 36.8356 | 117.3897 | 2004.598 |
|  |  | Preferred embodiment | 36.8256 | 117.581 | 1939.256 |
|  | 37 | JMVC | 34.62 | 67.0744 | 3759.203 |
|  |  | Shen | 34.5921 | 68.1289 | 1798.597 |
|  |  | Preferred embodiment | 34.5894 | 68.8136 | 1702.569 |

As shown in Tables 4, 5 and 6, the preferred embodiment can provide PSNR and bit rate similar to those of the JMVC method and the Shen method. Particularly, the Shen method and the preferred embodiment can reduce processing time so much as compared to the JMVC method. However, in the preferred embodiment, since each picture in each auxiliary-view image sequence has been divided into a plurality of macroblocks, video data encoding is processed in a unit of a macroblock not a whole picture, only a part of the macroblocks for one picture to be referenced needs to be stored during decoding. Therefore, the preferred embodiment can reduce requirement for picture buffers during decoding as compared to the JMVC method and the Shen method.

For encoded data of an auxiliary-view image sequence generated using the JMVC method and the Shen method, the minimum number of picture buffers (picture buffer$_{min}$) and the maximum number of picture buffers (picture buffer$_{max}$) required during decoding can be obtained by the following Expressions:

picture buffer$_{min}$=view number+3 picture buffer$_{max}$=view number+2×GOP+3

Where "view number" denotes the number of image sequences, and "GOP" denotes the number of a group of pictures (GOP), such as 8.

For encoded data of an auxiliary-view image sequence generated using the preferred embodiment, the minimum number of picture buffers (Picture buffer$_{MB,min}$) and the maximum number of picture buffers (Picture buffer$_{MB,max}$) required during decoding can be obtained by the following Expressions:

picture buffer$_{MB,min}$=(view number+3)×(frame size)/ (16×16)

picture buffer$_{MB,max}$=(view number+2×GOP+3)× (frame size)/(16×16)

where "frame size" denotes the number of pixels in a picture.

In an experiment for requirements for picture buffers during decoding encoded data corresponding to each of pictures (P1, P2, P3) shown in FIG. 10 and generated using each of the JMVC method, the Shen method and the preferred embodiment, the experimental results related to picture buffer space and picture buffer saving ratio are show in Table 7 below.

TABLE 7

|  | Method | Buffer space (frame/Macroblock) | Saving ratio (%) |
|---|---|---|---|
| P1 | JMVC | 27/32400 | 0 |
|  | Shen | 27/32400 | 0 |
|  | Preferred embodiment | 18.6/22311 | 31 |
| P2 | JMVC | 27/82944 | 0 |
|  | Shen | 27/82944 | 0 |
|  | Preferred embodiment | 20.6/63277 | 24 |
| P3 | JMVC | 27/32400 | 0 |
|  | Shen | 27/32400 | 0 |
|  | Preferred embodiment | 15.9/19091 | 41 |

As shown in Table 7, the preferred embodiment can effectively save picture buffer space required during decoding.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A multi-view video coding method using a hierarchical B-picture (HBP) prediction structure that includes a plurality of image sequences, each of the image sequences corresponding to an individual viewpoint, and including a plurality of pictures corresponding respectively to consecutive time-points, said multi-view video coding method comprising the steps of:
   a) grouping the image sequences into main-view image sequences and auxiliary-view image sequences, and configuring each of the auxiliary-view image sequences to be disposed between corresponding two adjacent ones of the main-view image sequences;
   b) for each of the pictures to be encoded in each of the main-view image sequences that serves as a first target picture,
      dividing the first target picture into a plurality of macroblocks, each of which is in the form of an n×n pixel array, and
      encoding video data in each of the macroblocks to be encoded of the first target picture based on a first reference macroblock unit, which is associated with a corresponding one of the macroblocks of the first target picture, in accordance with first decision criteria; and
   c) for each of the pictures to be encoded in each of the auxiliary-view image sequences that serves as a second target picture,
      dividing the second target picture into a plurality of macroblocks, each of which is in the form of an n×n pixel array, and
      encoding video data in each of the macroblocks to be encoded of the second target picture based on a second reference macroblock unit, which is associated with a corresponding one of the macroblocks of the second target picture, in accordance with second decision criteria, wherein, in step b):
   the first reference macroblock unit includes a first temporal reference macroblock and a second temporal reference macroblock; and the first decision criteria are configured to
predict whether the corresponding one of the macroblocks of the first target picture is within a background image region of the first target picture, and
encode the video data in the corresponding one of the macroblocks of the first trarget picture by using the first temporal reference macroblock of the first reference macroblock unit upon predicting that the corres ondin one of the macroblocks is within the back round image region, and by using the first and second temporal reference macroblocks of the first reference macroblock unit upon predicting that the corresponding one of the macroblocks of the first target picture is not within the background image region, wherein whether the corresponding one of the macroblocks of the first target picture is within the background image region is predicted based on a motion vector value associated with a left, upper or upper left macroblock relative to the corresponding one of the macroblocks of the first target picture.

2. The multi-view video coding method as claimed in claim 1, wherein
when the motion vector value is zero, the corresponding one of the macroblocks of the first target picture is predicted to be within the background image region.

3. The multi-view video coding method as claimed in claim 1, wherein, in step b), in a corresponding one of the main-view image sequences,
a corresponding macroblock of one picture, which corresponds to an earlier time-point relative to that of the first target picture, serves as the first temporal reference macroblock, and
a corresponding macroblock of one picture, which corresponds to a later time-point relative to that of the first target picture, serves as the second temporal reference macroblock.

4. The multi-view video coding method as claimed in claim 1, wherein, in step c):
the second reference macroblock unit includes a pair of first and second temporal reference macroblocks, and a pair of first and second spatial reference macroblocks; and
the second decision criteria are configured to
determine whether the second target picture is an anchor picture,
encode the video data in the corresponding one of the macroblocks of the second target picture by using the first and second spatial reference macroblocks of the second reference macroblock unit upon detecting that the second target picture is an anchor picture, and
upon detecting that the second target picture is not an anchor picture,
predict whether the corresponding one of the macroblocks of the second target picture is within a background image region of the second target picture, and
encode the video data in the corresponding one of the macroblocks of the second target picture by using at least one of the first and second temporal reference macroblocks of the second reference macroblock unit upon predicting that the corresponding one of the macroblocks of the second target picture is within the background image region, and by using at least one of the first and second spatial reference macroblocks of the second reference macroblock unit upon predicting that the corresponding one of the macroblocks of the second target picture is not within the background image region.

5. The multi-view video coding method as claimed in claim 4, wherein, when the second target picture is an anchor picture,
a corresponding macroblock of one picture, which is in one of the main-view image sequences adjacent to a corresponding of the auxiliary-view image sequences and corresponding to a viewpoint at the left of that of the corresponding one of the auxiliary-view image sequences, and which corresponds to the same time-point as that of the second target picture, serves as the first spatial reference macroblock, and
a corresponding macroblock of one picture, which is in one of the main-view image sequences adjacent to the corresponding one of the auxiliary-view image sequences and corresponding to a viewpoint at the right of that of the corresponding one of the auxiliary-view image sequences, and which corresponds to the same time-point as that of the second target picture, serves as the second spatial reference macroblock.

6. The multi-view video coding method as claimed in claim 4, wherein, when the second target picture is not an anchor picture, whether the corresponding one of the macroblocks of the second target picture is within the background image region is predicted based on a motion vector complexity value and an average motion vector value associated with at most left, upper and upper left ones of the macroblocks relative to the corresponding one of the macroblocks of the second target picture.

7. The multi-view video coding method as claimed in claim 6, wherein, when the motion vector complexity value and the average motion vector value are respectively smaller than a predetermined first threshold value and a predetermined second threshold value, the corresponding one of the macroblocks of the second target picture is predicted to be within the background image region.

8. The multi-view video coding method as claimed in claim 7, wherein, in the corresponding one of the auxiliary-view image sequences:
a corresponding macroblock of one picture, which corresponds to an earlier time-point relative to that of the second target picture, serves as the first temporal reference macroblock of the second reference macroblock unit; and
a corresponding macroblock of one picture, which corresponds to a later time-point relative to that of the second target picture, serves as the second temporal reference macroblock of the second reference macroblock unit.

9. The multi-view video coding method as claimed in claim 8, wherein:
when the average motion vector value is zero, the video data in the corresponding one of the macroblocks of the second target picture is encoded by using the first temporal reference macroblock; and
when the average motion vector value is not zero, the video data in the corresponding one of the macroblocks of the second target picture is encoded by using the first and second temporal reference macroblocks.

10. Th multi-view video coding method as claimed in claim 6, wherein:
when one of the motion vector complexity value and the average motion vector value is not smaller than a corresponding one of the predetermined first threshold value and the predetermined second threshold value, the corresponding one of the macroblocks of the second target picture is predicted to be within the foreground image region;

a corresponding macroblock of one picture, which is in one of the main-view image sequences adjacent to the corresponding of the auxiliary-view image sequences and corresponding to a viewpoint at the left of that of the corresponding one of the auxiliary-view image sequnces and which corresponds to the same time-point as that of the second target picture, serves as the first spatial reference macroblock; and a corresponding macroblock of one picture, which is in one of the main-view image sequences adjacent to the corresponding one of the auxiliary-view image sequences and corresponding to a viewpoint at the right of that of the corresponding one of the auxiliary-view image sequences and which corresponds to the same time-point as that of the second target picture, serves as the second spatial reference macroblock.

11. The multi-view video coding method as claimed in claim 10, wherein:

the second decision criteria are configured to determine whether the corresponding one of the macroblocks of the second target picture is within any one of a left image region and a right image region of the second target picture;

upon detecting that the corresponding one of the macroblocks of the second target picture is within the left image region of the second target picture, the video data in the corresponding one of the macroblocks is encoded by using the first spatial reference macroblock of the second reference macroblock unit;

upon detecting that the corresponding one of the macroblocks of the second target picture is within the right image region of the second target picture, the video data in the corresponding one of the macroblocks is encoded by using the second spatial reference macroblock of the second reference macroblock unit; and upon detecting that the corresponding one of the macroblocks of the second target picture is not within the left image region nor the right image region of the second target picture, the video data in the corresponding one of the macroblocks is encoded by using the first and second spatial reference macroblocks of the second reference macroblock unit.

\* \* \* \* \*